United States Patent
Hellyer et al.

(10) Patent No.: US 10,997,057 B2
(45) Date of Patent: May 4, 2021

(54) DEBUGGING ASYNCHRONOUS FUNCTIONS

(71) Applicant: INTERNATIONAL BUSINESS MACHINES CORPORATION, Armonk, NY (US)

(72) Inventors: Howard Hellyer, Kings Worthy (GB); Richard Chamberlain, Southampton (GB); Adam J. Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/191,860

(22) Filed: Nov. 15, 2018

(65) Prior Publication Data

US 2020/0159641 A1 May 21, 2020

(51) Int. Cl.
*G06F 11/36* (2006.01)

(52) U.S. Cl.
CPC ........ *G06F 11/364* (2013.01); *G06F 11/3612* (2013.01)

(58) Field of Classification Search
None
See application file for complete search history.

(56) References Cited

U.S. PATENT DOCUMENTS

| | | | |
|---|---|---|---|
| 9,092,564 B2 | 7/2015 | Wischik et al. | |
| 9,223,681 B2 | 12/2015 | Delporte | |
| 9,378,117 B2* | 6/2016 | Payne | G06F 11/3636 |
| 9,582,312 B1* | 2/2017 | Karppanen | G06F 11/079 |
| 2014/0215443 A1* | 7/2014 | Voccio | G06F 11/3688 |
| | | | 717/128 |
| 2014/0237452 A1* | 8/2014 | Wischik | G06F 9/4484 |
| | | | 717/125 |
| 2016/0328488 A1* | 11/2016 | Lytle | G06F 16/252 |
| 2019/0018754 A1* | 1/2019 | Schmelter | G06F 9/547 |
| 2020/0159641 A1* | 5/2020 | Hellyer | G06F 11/3636 |

OTHER PUBLICATIONS

Arnold, "Stack Trace Analysis for Large Scale Debugging", 2007, International Parallel and Distributed Processing Symposium ( Year: 2007).*
https://www.jetbrains.com/help/idea/async-stacktraces.html, "Async Stacktraces", Async Stacktraces—Help | IntelliJ IDEA, Jun. 18, 2018, pp. 1-3.
Arnold et al., "Stack Trace Analysis for Large Scale Debugging", ResearchGate, Conference Paper, Jan. 2007, https://www.researchgate. net/publication/220952194, pp. 1-16.

* cited by examiner

*Primary Examiner* — Hossain M Morshed
(74) *Attorney, Agent, or Firm* — Tihon Poltavets (57) ABSTRACT

A method for debugging asynchronous functions in a computer system that implements a runtime stack when executing a program includes, in response to an asynchronous called function being invoked by a calling function of a first execution thread, copying active stack frames of the runtime stack and storing the copied active stack frames as a duplicate stack.

15 Claims, 5 Drawing Sheets

DEBUGGING ASYNCHRONOUS FUNCTIONS

FIELD OF INVENTION

This disclosure relates generally to computer systems, and in particular to debugging asynchronous functions in computer systems.

BACKGROUND OF THE INVENTION

Modern computer programs implemented in computer systems often have to manage multiple functions (or tasks) in the execution of a single computer program. One common implementation technique is to employ asynchronous callbacks that enable a calling function within the program to execute one or more asynchronous called functions. When these functions fail, it can be difficult to determine the cause of failure. Such a problem is common when employing various programming languages for a computer program, and a known approach which attempts to deal with this issue is to employ long stack traces. However, such an approach may not be efficient as it requires saving a stack trace every time a call-back is created. Management of the saved information is typically not cost efficient, and the approach does not have the benefits of providing an integrated runtime stack for debugging.

SUMMARY

Embodiments in accordance with the present invention disclose a method, computer program product and computer system method for debugging asynchronous functions in a computer system that implements a runtime stack when executing a program. The method, computer program product and computer can include, in response to an asynchronous called function being invoked by a calling function of a first execution thread, copying active stack frames of the runtime stack and storing the copied active stack frames as a duplicate stack.

DETAILED DESCRIPTION

The present invention seeks to provide a computer-implemented method for debugging asynchronous functions in a computer system that implements a runtime stack when executing a program.

The present invention further seeks to provide a computer program product including computer program code for implementing a proposed method when executed by a processing unit.

The present invention also seeks to provide a processing system adapted to execute this computer program code.

The present invention also seeks to provide a system for debugging asynchronous functions in a computer system that implements a runtime stack when executing a program.

According to an aspect of the present invention there is provided a computer-implemented method for debugging asynchronous functions in a computer system that implements a runtime stack when executing a program. The method comprises, in response to an asynchronous called function being invoked by a calling function of a first execution thread, copying active stack frames of the runtime stack and storing the copied active stack frames as a duplicate stack.

According to another aspect of the invention, there is provided a computer program product for debugging asynchronous functions in a computer system that implements a runtime stack when executing a program. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

According to yet another aspect of the invention, there is provided a system for debugging asynchronous functions in a computer system that implements a runtime stack when executing a program. The system comprises a stack duplication component configured, in response to an asynchronous called function being invoked by a calling function of a first execution thread, to copy active stack frames of the runtime stack and to store the copied active stack frames as a duplicate stack.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed is a concept that may be useful for debugging asynchronous functions in a computer system that implements a runtime stack when executing a program. By copying active stack frames of the runtime stack and storing the copied active stack frames as a duplicate stack, information about the context in which an asynchronous called function is invoked may be obtained. This information may otherwise be unavailable if relying only on the stack when an error or failure occurs. Accordingly, proposed embodiments may provide useful information for debugging purposes.

A tool for enabling improved debugging of asynchronous functions may therefore be provided by a proposed embodiment. Embodiments may therefore cater for asynchronous functions through the provision of extended stack tracing concepts that record the stack of the context in which an asynchronous function is invoked.

By way of example, proposed embodiments may duplicate the runtime stack for the purpose of creating information about an invocation context. Such a duplicated stack may be thought of as a 'synthetic' stack that is associated with an asynchronous function of callback. When a callback is invoked, the duplicated stack information may be appended to the stack.

The calling function may be an existing function that is running in the system, and the called function may be a function that is associated with the calling function so that there is provided a relationship (e.g. parent-child) between the functions. By way of example, the calling function may be a function of a client application that is executed by the system, and the called function may be started by the calling function, by another function of client application, or by another client application. Thus, it will be appreciated that a request (or call) to execute or start a called function may originate from many different sources, such as: the calling function; another function; a client application to which the calling function belongs; or another client application of the system.

Accordingly, proposed embodiments may provide a tool or concepts for assisting in the debugging of asynchronous functions. This may help to improve an understanding of how errors of failures in a program employing an asynchronous function may have occurred.

Reference to a runtime stack is to be taken to refer to the known concept of a stack data structure that store information about the active subroutines (or functions) of a computer program. A runtime stack may also be known as an execution stack, program stack, control stack, or machine stack. It may often be shortened to just "the stack". Details of the runtime stack are normally hidden and automatic in high-level programming languages. Thus, instruction sets may be employed which provide special instructions for manipulating stacks.

Embodiments may be thought of capturing information about the runtime stack at a point in time when an asynchronous function is invoked. This may enable information about the context in which an asynchronous function was invoked to be ascertained. Because the runtime stack may be constantly changing as a computer program executes, such information may otherwise unavailable at a later time when an error or failure occurs.

Embodiments may provide concepts that facilitate the efficient and effective provision of contextual information for an asynchronous called function. Such concepts may be based on storing copied active stack frames of the runtime stack as a duplicate stack in response to an asynchronous called function being invoked.

By way of further example, embodiments may propose extensions to existing computer systems and/or debugging systems. Such extensions may enable the provision of additional information by leveraging proposed concepts. In this way, a conventional computer system or debugging system may be upgraded by implementing or 'retro-fitting' a proposed embodiment.

Proposed embodiments may overcome shortcomings of existing debugging concepts which require saving a stack trace every time a callback is received.

Illustrative embodiments may provide concepts for analyzing and identifying the context in which an asynchronous function is/was invoked, and such concepts may cater for changes over time. Dynamic information capture and debugging concepts may therefore be provided by proposed embodiments.

Modifications and additional steps to a traditional debugging system may also be proposed which may enhance the value and utility of the proposed concepts.

Embodiments may further comprise including a first marker frame in the duplicate stack, wherein the first marker frame is configured to identify where execution switched to a second execution thread associated with the asynchronous called function. This may prevent program execution working back up the stack past the creation point such as where the first marker frame is inserted (which identifies where execution switched threads). Execution may thus be prevented from returning past that point. However, if an error occurs, the marker frame may be ignored by tools for producing or reading diagnostics. Embodiments may therefore facilitate debugging tools that can walk and display a full stack that includes the duplicated (i.e. 'synthetic') stack frames and hence the creation context for the asynchronous function.

Some embodiments may further comprise including a first pointer frame in the runtime stack, wherein the first pointer frame is configured to identify a storage location where the duplicate stack is stored. This may, for example, be useful if multiple sub-contexts are created.

Another exemplary embodiment may further comprise, in response to a call-back to the first execution thread being invoked, appending the duplicate stack to the runtime stack to generate a modified runtime stack. For example, when the call-back is invoked, the duplicated stack information may be appended to the bottom of the run-time stack ahead of any stack frames that are created as a result of the call-back's execution.

Further, an embodiment may also comprise the step of including a second marker frame in the modified runtime stack, wherein the second marker frame is configured to identify where execution switched from a second execution thread associated with the asynchronous called function to the first execution thread. Such a second marker frame may indicate the end of the copied (or 'synthetic') stack frames. When the stack unwinds, first and second marker frames, and frames therebetween, may be skipped.

Also, an embodiment may further comprise including a second pointer frame in the duplicate stack, the second pointer frame being configured to identify where the runtime stack is stored.

A yet further embodiment may also comprise the step of including a third marker frame in the duplicate stack, wherein the third marker frame is configured to identify where execution switched to a third execution thread associated with a further function called by the asynchronous called function. Such a third marker frame may indicate where another asynchronous function is called by the asynchronous called function. In this way, a marker frame may be provided for each asynchronous function call, so that the complete 'chain' of function calls/requests can be examined in the case of failure.

In an embodiment, the duplicate stack may be stored in a format that is compatible with an Application Binary Interface (ABI) of the computer system. Synthetic frames copied back to the runtime stack may thus be in the same format as any other stack frames, and they may be identified as synthetic frames by being stored between first and second marker frames for example.

Accordingly, in some embodiment, marker frames may be the only extension required to the ABI of the computer system. This may minimize changes required to include these frames in the output of a stack trace.

A copied active stack frame of the duplicate stack may contain a pointer to an object in a runtime heap of the computer system. Following such pointers to read the contents of the memory in the heap can be useful when debugging. However, there is an associated memory cost of keeping all the pointers in the stack 'alive' (i.e. not freeing the memory to which it points). Being a copy of the active stack, the copied active stack frames of the duplicate stack may also comprise pointers that may provide an improved ability to debug asynchronous functions that other solutions (e.g. stack traces) do not provide. Further, marker frames added to the duplicate stack may allow a garbage collection (GC) mechanism to selectively decide (at runtime) whether to keep pointer in the stack alive for debugging purposes. Put another way, in a managed runtime, memory management code (such as the garbage collector or reference counter implementation) may choose whether references from the duplicated stack keep objects alive. This could be a dynamic decision based on heap occupancy or a fixed policy built into the runtime for example.

Figure 1:
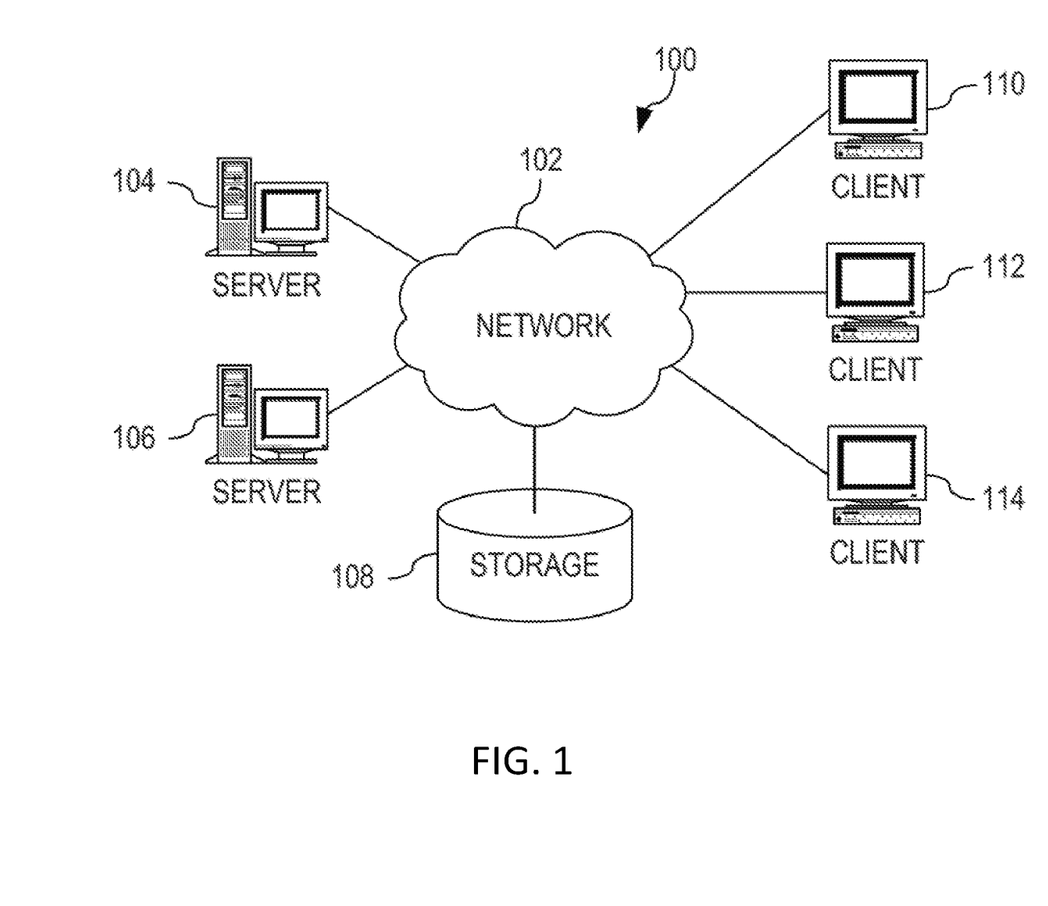
FIG. 1 is a functional block diagram illustrating a distributed data processing environment, in accordance with an embodiment of the present invention.
Figure 2:
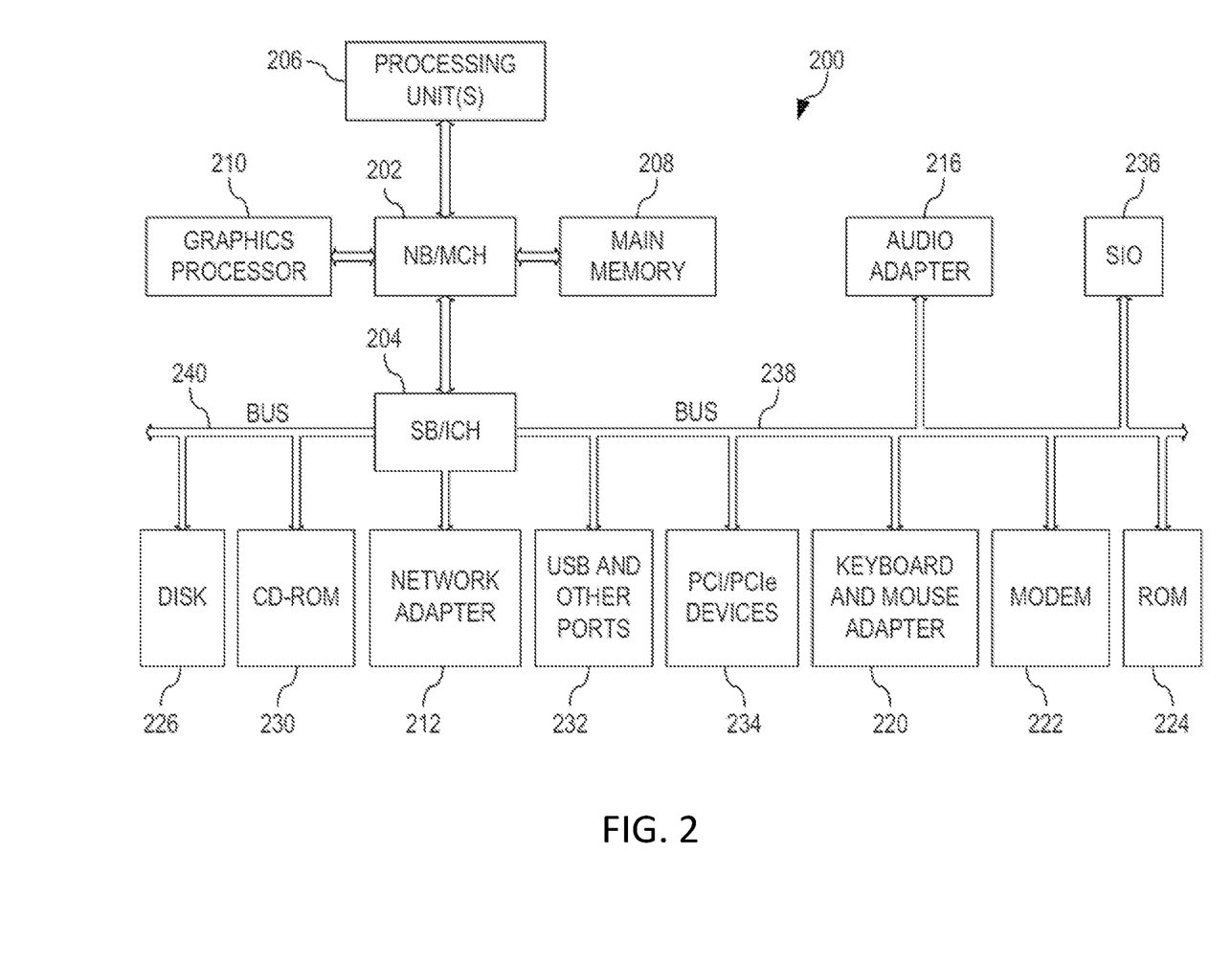
FIG. 2 is a flowchart depicting operational steps of a parts performance matching program for component selection in a manufacturing setting, in accordance with an embodiment of the present invention.

Illustrative embodiments may be utilized in many different types of task processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, may run in conjunction with the operating system and provides calls to the operating system from object-orientated programs or applications executing on system 200.

As a server, system 200 may be a desktop computer, a laptop computer, a tablet computer, a specialized computer server, a smartphone, or any other computer system known in the art. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance debugging concepts by facilitating the identification and analysis of the context in which an asynchronous function was. Embodiments may provide such contextual information storing copied active stack frames of the runtime stack as a duplicate stack in response to an asynchronous called function being invoked. Put another way, embodiments may capture information about the runtime stack at a point in time when an asynchronous function is invoked. Because the runtime stack may be constantly changing as a computer program executes, such information may otherwise unavailable at a later time when an error or failure occurs.

By way of example, a proposed embodiment may provide extended stack traces by recording the runtime stack in the context the asynchronous called function was requested. This is done, for instance, by duplicating the runtime stack information and the duplicated runtime stack is then stored as 'synthetic' stack frames with the asynchronous callback until it is invoked back on the original execution thread. When the callback is invoked, the duplicated stack information may be appended to the bottom of the thread stack ahead of any stack frames that are created as a result of the callback's execution.

Further, in one example, the duplicate stack is stored in a format compatible with the current runtime (which may, for example, employ an Application Binary Interface (ABI) defining how the runtime performs low level operations such as calling functions and creating stack frames)).

To prevent program execution working back up the stack past the creation point, a 'marker' frame may be inserted which identifies where the execution switched threads. The marker frame may be configured to prevent execution returning past that point. However, if an error occurs, the marker frames can be ignored by tools for producing or reading diagnostics. Such tools may display and traverse a full stack that includes the 'synthetic' frames and hence the creation context for the task. It will therefore be appreciated that marker frames employed by proposed embodiment can either delimit frames in a single stack, or point to another location where this part of the stack is stored. This can be useful if multiple sub-contexts are created.

Figure 3:
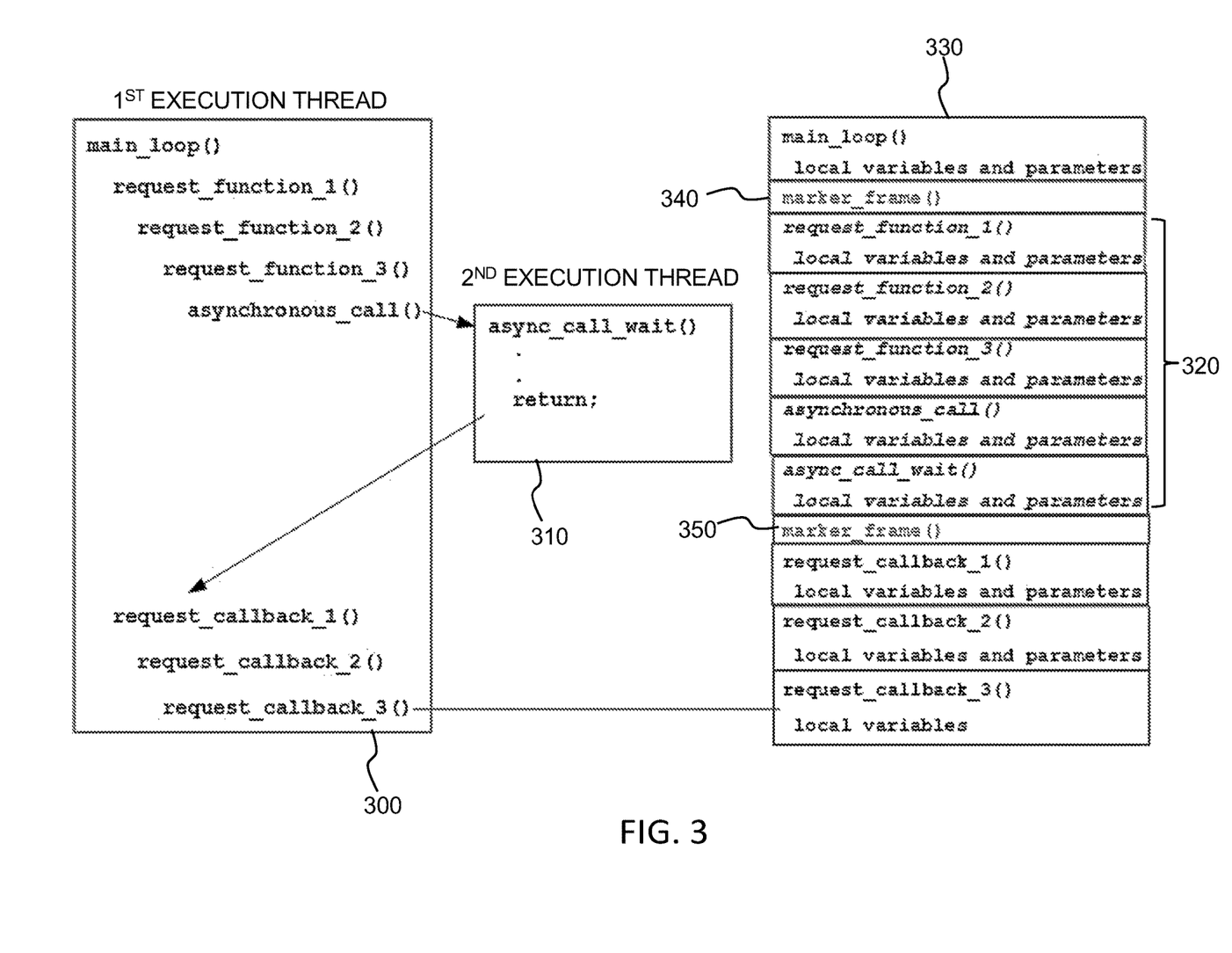
FIG. 3 is an example of a random selection of parts with a single Part Attribute (PA) and an altered selection of parts with a single Part Attribute (PA), in accordance with an embodiment of the present invention.

Referring now to FIG. 3, there is depicted an exemplary implementation of a method according to an embodiment. Here, an example application has a main thread 300 (hereinafter referred to as a first execution thread 300) which runs a loop ('main_loop( )'), handling incoming requests. A typical request is processed by a first function ('request_function_1( )'), which calls second and third (nested) functions ('request_function_2( )' and 'request_function_3( )'). The third function ('request_function_3( )') needs to perform a relatively long-running operation (for example, a database update or a network access), so it calls an asynchronous called function ('asynchronous_call( )') to start a separate thread (hereinafter referred to as a second execution thread 310). The asynchronous second execution thread 310 calls a blocking function ('async_call_wait( )') and, when that function returns, further processing of the request is scheduled back on the first execution thread 300 (with the function 'request_callback_1( )'), and the second execution thread 310 terminates.

If there is a failure during the processing in functions request_callback_1( ), request_callback_2( ) or request_callback_3( ), a stack trace obtained using conventional approaches would only show the stack frames that are currently available on the main thread, namely: main_loop( ), request_callback_1( ), request_callback_2( ) or request_callback_3( ).

However, according to the proposed embodiment, when the asynchronous second execution thread is started (i.e. in response to the asynchronous called function ('asynchronous_call( )') being invoked by a calling function ('request_function_3( )') of the first execution thread 300), the active stack frames 320 of the runtime stack for functions request_function_1( ), request_function_2( ) and request_function_3( ) are copied to a new stack 330 on the asynchronous second execution thread 310 thread.

Also, when processing of the request is scheduled back on the first execution thread 300 (via function request_callback_1( )), stack frames are copied across to the stack on the first execution thread 300.

Furthermore, in this embodiment, first 340 and second 350 marker frames are included to indicate the start and end of the copied or 'synthetic' stack frames 320 respectively. In particular, first marker frame 340 identifies where execution switched to the second execution thread associated with the asynchronous called function, and the second marker frame 350 identifies where execution switched from the second execution thread 310 associated with the asynchronous called function to the first execution thread 300. When the stack unwinds, the marker and enclosed frames are skipped.

As a result of the proposed embodiment copying active stack frames of the runtime stack and storing them in a duplicate stack 330, if there is a failure during the processing in functions request_callback_1( ), request_callback_2( ) or request_callback_3( ), the stack trace 330 will show all the stack frames that were involved in processing the request. The local variables and parameters in the duplicated stack frames will include vital information (e.g. the results or return code from the blocking operation that took place on the asynchronous second execution thread 310).

It is also noted that, in the example depicted by FIG. 3, each of the copied active stack frames of the duplicate stack comprises a pointer to an object in a runtime heap of the computer system.

Figure 4:
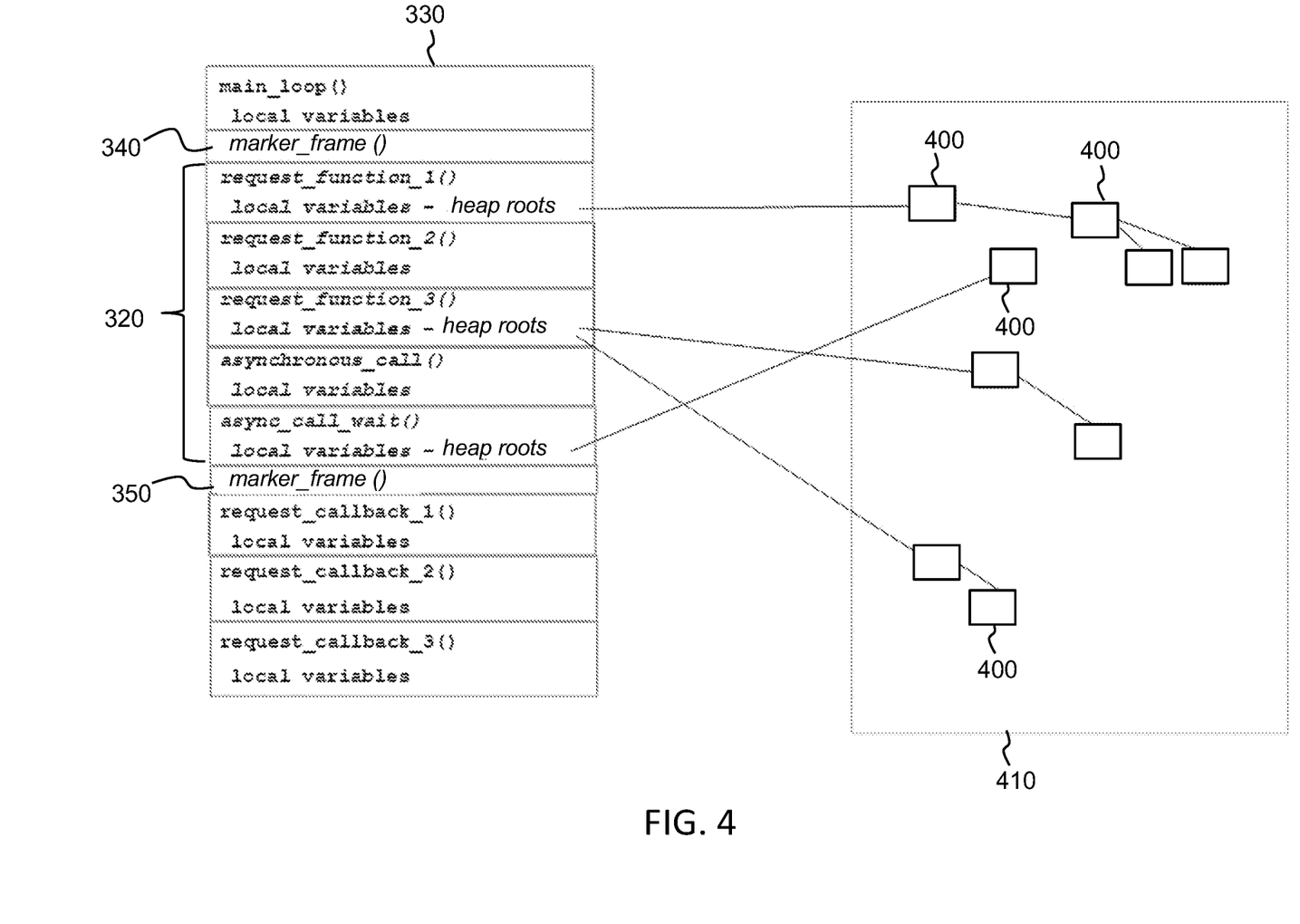
FIG. 4 is an example of a product template cluster for a Real-time Parts Performance Matching (RPPM) engine of a part performance matching program, in accordance with an embodiment of the present invention.

By way of further description, FIG. 4 shows how variables in the duplicate stack frames 320 may be pointers to objects 400 in a managed runtime heap 410.

In a managed runtime, the memory management code (such as the garbage collector or reference counter implementation) can choose whether references from the duplicate stack frames keep objects alive. This could be a dynamic decision based on heap occupancy or a fixed policy built into the runtime.

In a garbage collected environment, the stack frames between the first 340 and second 350 marker frames would be counted as GC roots. In a reference counted environment, the reference counts to objects referenced from the duplicated (i.e. 'synthetic') frames would be incremented when the context was created. Keeping the referenced heap objects alive provides access to application data and improves the ease with which application failures can be debugged.

It may be preferable that the synthetic frames copied back to the runtime stack area in the same format as any other stack frames. The may be identified as being synthetic frames by being stored between the first 340 and second 350 marker frames. Thus, the marker frames may be the only extension required to the ABI. This minimises changes required to include these frames in the output of a stack trace.

Figure 5:
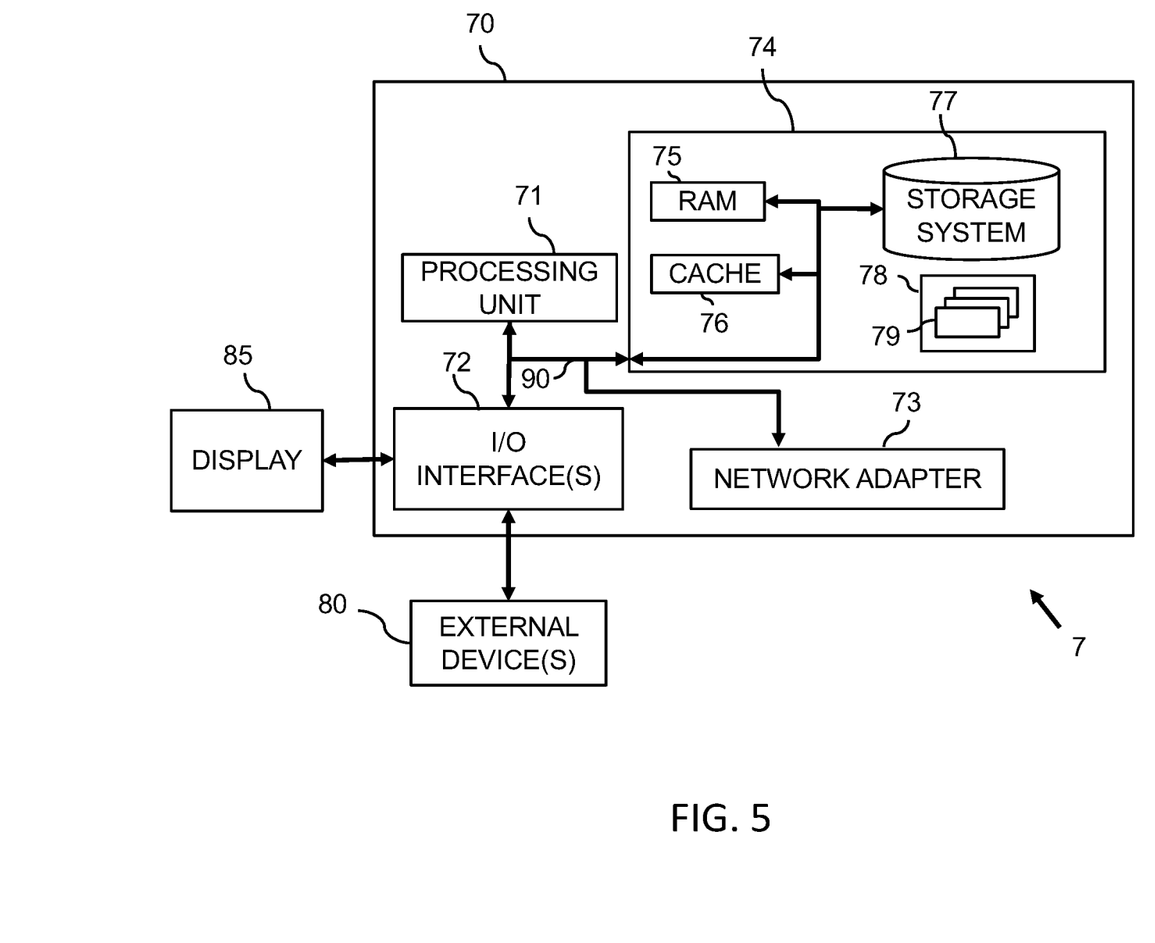
FIG. 5 is a block diagram of components of a computer system, such as the server computer of FIG. 1, in accordance with an embodiment of the present invention.

By way of further example, as illustrated in FIG. 5, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for debugging asynchronous functions in a computer system that implements a modified runtime stack when executing a program, the method comprising:

in response to an asynchronous called function being invoked by a calling function of a first execution thread, copying active stack frames of the runtime stack and storing the copied active stack frames as a duplicate stack;

in response to a callback to the first execution thread being invoked, appending the duplicate stack to the runtime stack to generate the modified runtime stack;

including a first marker frame in the modified runtime stack, the second marker frame being configured to identify where execution switched from a second execution thread associated with the asynchronous called function to the first execution thread; and including a first pointer frame in the duplicate stack, a second pointer frame being configured to identify where the runtime stack is stored.

2. The method of claim 1, further comprising:
including a second marker frame in the duplicate stack, the first marker frame being configured to identify where execution switched to a second execution thread associated with the asynchronous called function.

3. The method of claim 1, further comprising:
including a second pointer frame in the runtime stack, the first pointer frame being configured to identify a storage location where the duplicate stack is stored.

4. The method of claim 1, wherein the duplicate stack is stored in a format that is compatible with an Application Binary Interface of the computer system.

5. The method of claim 1, wherein a copied active stack frame of the duplicate stack comprises a pointer to an object in a runtime heap of the computer system.

6. A computer program product for debugging asynchronous functions in a computer system that implements a modified runtime stack when executing a program, the computer program product comprising:

one or more computer readable storage media and program instructions stored on at least one of the one or more storage media, the program instructions comprising:

program instructions to, in response to an asynchronous called function being invoked by a calling function of a first execution thread, copy active stack frames of the runtime stack and store the copied active stack frames as a duplicate stack;

program instructions to, in response to a callback to the first execution thread being invoked, append the duplicate stack to the runtime stack to generate the modified runtime stack;

program instructions to include a first marker frame in the modified runtime stack, the second marker frame being configured to identify where execution switched from a second execution thread associated with the asynchronous called function to the first execution thread; and program instructions to include a first pointer frame in the duplicate stack, a second pointer frame being configured to identify where the runtime stack is stored.

7. The computer program product of claim 6, further comprises program instructions, stored on the one or more computer readable storage media, which when executed by a processor, cause the processor to:

include a second marker frame in the duplicate stack, the first marker frame being configured to identify where execution switched to a second execution thread associated with the asynchronous called function.

8. The computer program product of claim 6, further comprises program instructions, stored on the one or more computer readable storage media, which when executed by a processor, cause the processor to:

include a second pointer frame in the runtime stack, the first pointer frame being configured to identify a storage location where the duplicate stack is stored.

9. The computer program product of claim 6, wherein the duplicate stack is stored in a format that is compatible with an Application Binary Interface of the computer system.

10. The computer program product of claim 6, wherein a copied active stack frame of the duplicate stack comprises a pointer to an object in a runtime heap of the computer system.

11. A computer system for debugging asynchronous functions in a computer system that implements a modified runtime stack when executing a program, the computer system comprising:

one or more computer processors;
one or more computer readable storage media; and
program instructions stored on the computer readable storage media for execution by at least one of the one or more computer processors, the program instructions comprising:

program instructions to, in response to an asynchronous called function being invoked by a calling function of a first execution thread, copy active stack frames of the runtime stack and store the copied active stack frames as a duplicate stack;

program instructions to, in response to a callback to the first execution thread being invoked, append the duplicate stack to the runtime stack to generate the modified runtime stack;

program instructions to include a first marker frame in the modified runtime stack, the second marker frame being configured to identify where execution switched from a second execution thread associated with the asynchronous called function to the first execution thread; and program instructions to include a first pointer frame in the duplicate stack, a second pointer frame being configured to identify where the runtime stack is stored.

12. The computer system of claim 11, further comprises program instructions, stored on the one or more computer readable storage media, which when executed by a processor, cause the processor to:

include a second marker frame in the duplicate stack, the first marker frame being configured to identify where execution switched to a second execution thread associated with the asynchronous called function.

13. The computer system of claim 11, further comprises program instructions, stored on the one or more computer readable storage media, which when executed by a processor, cause the processor to:

include a second pointer frame in the runtime stack, the first pointer frame being configured to identify a storage location where the duplicate stack is stored.

14. The computer system of claim 11, wherein the duplicate stack is stored in a format that is compatible with an Application Binary Interface of the computer system.

15. The computer system of claim 11, wherein a copied active stack frame of the duplicate stack comprises a pointer to an object in a runtime heap of the computer system.

* * * * *